United States Patent [19]

Banzi et al.

[11] Patent Number: 5,578,540
[45] Date of Patent: Nov. 26, 1996

[54] CATALYST FOR THE PREPARATION OF ELASTOMERIC ETHYLENE-PROPYLENE COPOLYMERS

[75] Inventors: Viviano Banzi, Vigarano Mainarda; Gianni Loberti, Porotto, both of Italy

[73] Assignee: Enichem Elastomeri S.r.L., Milan, Italy

[21] Appl. No.: 595,451

[22] Filed: Feb. 5, 1996

Related U.S. Application Data

[63] Continuation of Ser. No. 348,120, Nov. 28, 1994, abandoned.

[30] Foreign Application Priority Data

Dec. 17, 1993 [IT] Italy .................... MI93A2649
Nov. 3, 1994 [IT] Italy .................... MI94A0454

[51] Int. Cl.$^6$ .................................. B01J 31/38
[52] U.S. Cl. .................. 502/115; 502/114; 502/126; 502/127; 502/132; 526/124.7
[58] Field of Search .................. 502/114, 115, 502/126, 127, 132

[56] References Cited

U.S. PATENT DOCUMENTS

| | | | |
|---|---|---|---|
| 4,186,107 | 1/1980 | Wagner | 252/429 B |
| 4,517,307 | 5/1985 | Cuffiani et al. | 502/119 |
| 4,736,002 | 4/1988 | Allen et al. | 526/125 |
| 5,037,997 | 8/1991 | Zhukou et al. | 585/512 |

*Primary Examiner*—Michael Lusignan
*Assistant Examiner*—Timothy H. Meeks
*Attorney, Agent, or Firm*—Oblon, Spivak, McClelland, Maier & Neustadt, P.C.

[57] ABSTRACT

Solid component of a catalyst for the synthesis of elastomeric Ethylene-Propylene copolymers typically amorphous, basically consisting of a Titanium compound supported on a solid component mainly consisting of $MgCl_2$, prepared by a process which comprises putting a solution (I), basically consisting of an organometallic compound of Aluminium diluted with aliphatic hydrocarbons, in contact with a solution (II) containing an anhydrous Magnesium halide in a composition of solvents selected from halohydrocarbons and aromatic hydrocarbons and relative mixtures, in the presence of an Aluminium trihalide;

a tetravalent Titanium compound having general formula $Ti(OR)_{4-n}X_n$.

7 Claims, No Drawings

CATALYST FOR THE PREPARATION OF ELASTOMERIC ETHYLENE-PROPYLENE COPOLYMERS

This application is a continuation of application Ser. No. 08/348,120, filed on Nov. 28, 1994, now abandoned.

BACKGROUND OF THE INVENTION

The present invention relates to solid catalytic components of the Ziegler-Natta type, suitable for the synthesis of elastomeric copolymers having a high purity and to the process for their preparation.

The present invention also relates to the use of these catalytic components in the synthesis of elastomeric copolymers of ethylene with propylene, prevalently amorphous and with a high purity.

DESCRIPTION OF THE PRIOR ART

It is known in the art that prevalently amorphous polymers of ethylene with propylene can be advantageously produced using Ziegler-Natta type catalysts, as described in G. Natta, G. Mazzanti et al., Journal of Polymer Science Vol. 51 (1961) page 411, and in Fr-A-2,027457.

These catalysts consist of at least two components:
a) a salt of a transition metal belonging to a group from IV to VIII of the periodic table,
b) an organometallic compound of a metal belonging to a group from I to IV of the periodic table.

To obtain copolymers characterized by a low crystallinity, sufficiently narrow distribution of molecular weights and composition, a Vanadium compound is preferred as the transition metal salt: in this case the complete catalytic system comprises a third component (c) capable of raising the polymerization productivity expressed as Kg of polymer produced per gram of Vanadium per hour.

Type "a" components particularly used are salts of Vanadium with a valence of from 3 to 5, such as for example Vanadium halides, Vanadium oxyhalides, Vanadium or Vanadyl alcoholates and Vanadium acetylacetonate.

Preferred type "b" components are organometallic compounds of Aluminium such as Aluminium trialkyls, Aluminium alkylhalides.

The type "c" components are generally halogenated organic compounds of the chloroalkane or chloroester type such as for example $CHCl_3$, $CCl_4$, ethyltrichloroacetate or n-butyl perchlorocrotonate.

For the production of ethylene-propylene elastomeric copolymers, both solution and suspension processes are used.

The solution processes are characterized in that both the monomers and the polymers are dissolved in a hydrocarbon medium whereas in the suspension processes the polymerization is carried out in a medium in which the elastomer is substantially insoluble. This latter process generally comprises liquid propylene as suspending medium and has considerable economical advantages with respect to the solution, in particular:

i) high concentrations of polymer can be used in the reactor without causing great increases in viscosity in the reaction medium;
ii) no solvents or suspending agents are used which are extraneous to the polymerization and whose recycling would result in a considerable waste of energy;
iii) the reaction heat can be very efficiently removed by evaporation of the liquid monomers and their subsequent condensation before recharging them into the reactor.

For suspension processes, when the operating temperatures are not higher than 50° C., a particularly advantageous catalytic system consists of Vanadium triacetylacetonate (component "a"), Aluminium diethylmonochloride (component "b") and n-butyl perchlorocrotonate (component "c"); with this system a wide range of copolymers can be obtained, having satisfactory mechanical and elastic properties to be used for a variety of applications both as raw and vulcanized polymers.

Catalysts based on Vanadium salts however have the disadvantage of giving a low productivity. In addition, if the process does not comprise a final washing step, considerable quantities of catalytic residues can be present in the polymer, in particular chlorinated compounds resulting from the reaction of the Vanadium salt with the organometallic co-catalyst.

Catalysts which are suitable for the copolymerization of ethylene with propylene having a much higher productivity than that given by systems containing Vanadium compounds are described in patents U.S. Pat. No. 3,789,036, U.S. Pat. No. 4,013,823, U.S. Pat. No. 4,331,561, GB-A-2.099.836, GB-A-1.293.814, EP-A-301.894. The catalyts described in the above documents consist, in the preferred embodiment, of:

A) a solid obtained by putting a Titanium compound having the formula $Ti(OR)_nX_{4-n}$ (wherein R is an aliphatic, cycloaliphatic or aromatic radical containing a number of carbon atoms of between 1 and 20, X is a halogen atom and n is an integer of between 0 and 4) in contact with a Magnesium compound selected from the halides, alkoxyhalides or adducts between $MgCl_2$ and alcohols;

B) at least one organometallic compound of aluminium having the general formula $Al(Z_{3-m})X_m$ or $Al_2Z_tX_p$ wherein Z is an alkyl group, X is a halogen, m represents an integer of between 0 and 2, t and p represent integers between 1 and 5 with p+t=6.

Examples of type (B) compounds which can be used together with component (A) for the synthesis of polyolefins are: $Al(C_2H_5)_2Cl$, $Al(i-C_4H_9)_3$, $Al(C_2H_5)_3$, $Al_2(C_2H_5)_3Cl_3$ etc.

Examples of Magnesium compounds suitable for the preparation of the solid (A) are $MgCl_2$, $MgCl(O-C_4H_9)$, $MgCl_2.m(n-HOC_4H_9)$.

An example of a type (A) compound is described in Italian patent application IT-A-MI 91 A001935. This compound can be represented by the formula: $M_1Mg_{(0.3-20)}X_{(2-60)}Al_{(0-6)}(R-COO)_{(0.1-3)}$ wherein: M can be Ti, V, Zr or Hf; X is a halogen; R is a hydrocarbon radical containing at least 4 carbon atoms. According to a procedure described in the above patent application, the Titanium compound to be reacted is Titanium chloride 2-ethylhexanoate and the magnesium compound is magnesium chloride 2-ethyl-hexanoate.

For the preparation of an active solid compound (A) in the polymerization of ethylene and alpha-olefins various very effective processes are known in the art. Some of them comprise for example treatment with the Titanium compound of a solid support having a high surface area comprising the Magnesium compound, as described for example in EP-A-202.550 which discloses the preparation of a solid catalytic component (A) having a high productivity in the synthesis of polyolefins and which is prepared by grinding $MgCl_2$ together with Ethylbenzoate and subsequently treating the solid thus obtained with $TiCl_4$ in excess.

According to the disclosure of U.S. Pat. No. 4,843,049 the solid component (A) can be prepared for example with the following process: a) spray-drying of an ethanol solution of $MgCl_2$ to obtain a solid granular substrate; b) treatment of the substrate with $Ti(n-OC_4H_9)_4$ in n-decane; c) addition of $Al(C_2H_5)_2Cl$. The critical phase for the above method is in the preparation of the support based on Magnesium, particularly in the operations necessary for bringing the surface area to sufficiently high values to allow absorption of the Titanium compound: this phase is generally expensive and technologically very complex. Alternative processes which simplify the preparation of the support consist in: (a) treating a Magnesium compound previously brought into solution with a Titanium compound, (b) separating the solid (A) by treatment with a suitable precipitant.

According to an example of patent JP 56004608, the solid catalytic component (A) is prepared by adding butanol to a solution of $MgCl_2$ and Titanium tetrabutoxide in heptane, and then adding $AlCl_3$, $TiCl_4$ and methylhydropolysiloxane.

IT-A-19473/84 discloses how a solid component (A) can be obtained by reacting a Titanium compound (i) dissolved in a hydrocarbon (such as $Ti(O-C_4H_9)_4$ dissolved in anhydrous n-hexane) with a liquid complex (ii), having general formula $MX_2.n(AlRX_2).pAlX_3$, (wherein for example: M is Mg, X is Chlorine, R is the $C_2H_5$ radical; "n" and "p" are integers varying from 1 to 4 and from 0 to 1 respectively), and finally adding an electron-donor compound (iii) such as for example n-butyl ether or anisole. With this method the separation of the solid (A) takes place directly after the reaction between components (i) and (ii) without the use of further precipitants.

JP-A-158871 discloses that component (A) can be prepared by putting $TiCl_4$ in contact with a solid obtained by precipitation from a solution of anhydrous $MgCl_2$ in propylchloride in the presence of $AlCl_3$.

SUMMARY OF THE INVENTION

It has now been found, in accordance with the present invention, that the supporting of a Titanium compound on solid crystalline $MgCl_2$ can be advantageously carried out with a new simplified process.

On the basis of what is specified above, the present invention relates to a catalyst for the synthesis of prevalently amorphous elastomeric Ethylene-Propylene copolymers, consisting of a Titanium compound supported on a solid mainly consisting of $MgCl_2$, characterized in that it is prepared with a process which comprises:

i) putting a solution (I), basically consisting of an organometallic compound of Aluminium diluted with aliphatic hydrocarbons, in contact with a solution (II) prepared by means of the following steps:
 a) dissolution of an anhydrous Magnesium halide in a composition of solvents selected from halohydrocarbons and aromatic hydrocarbons and relative mixtures, in the presence of an Aluminium trihalide;
 b) treatment of the solution prepared in step (a) with a tetravalent Titanium compound having general formula $Ti(OR)_{4-n}X_n$, wherein R is an aliphatic, cycloaliphatic or aromatic hydrocarbon radical containing from 1 to 20 carbon atoms, X is a halogen and n is an integer from 0 to 4;
 c) possible treatment with an electron-donor compound selected from the group of esters of carboxylic acids and alkyl or aryl or arylalkyl ethers, contemporaneously with or following treatment with the Titanium compound of step (b);

ii) separation and possible purification of the solid catalytic component thus formed.

DESCRIPTION OF THE PREFERRED EMBODIMENTS

In a preferred embodiment, solution (II) is obtained by treating anhydrous $MgCl_2$ and $AlCl_3$ with a mixture of 1,2-dichlorethane and toluene, or with a mixture of n-butylchloride and 1,2-dichloroethane, at a temperature of between 10° and 90° C., and subsequently adding, after cooling to a temperature of between 10° and 40° C., $TiCl_4$, $Ti(O-nC_4H_9)_4$ or $TiCl(O-C_4H_9)_3$ and an electron-donor compound of the group of ethers or esters, preferably ethyl benzoate, di-n-butyl ether or anisole.

In both cases the ingredients are reacted in the following molar ratios:
$AlCl_3/MgCl_2$ from 1 to 5; 1,2-dichloroethane (or n-butylchloride)/$AlCl_3$ not less than 0.1; $MgCl_2$/Ti from 0.5 to 5; 1,2-dichloroethane/toluene from 0.05 to 5; electron-donor compound/Ti not more than 5. The concentration of $MgCl_2$, expressed with respect to the mixture (1,2-dichloroethane plus toluene or n-butylchloride and 1,2-dichloroethane) is preferably between 1 and 7 g/100 ml; the temperature at which the contact between the ingredients takes place is between 10° and 90° C. and the duration is between 0.5 and 8 hours.

Solution (I) basically consists of an organometallic compound of Aluminium having general formula $Al(Z_{3-m})X_m$ or $Al_2Z_tX_p$, wherein Z is an alkyl group, X a halogen, m an integer from 1 to 3, t and p represent integers between 1 and 5 with p+t=6, dissolved in a hydrocarbon solvent at a concentration of from 5 to 15 g/l. The molar ratio between the Aluminium alkyl of (I) and Titanium of (II) is preferably between 3 and 20. The mixing temperature of the two solutions is between 30° and 60° C.

The contact between solution (I) and (II) gives rise to the formation of the solid (A) which can be separated and washed with the conventional techniques.

In another form of embodiment, the precipitation of the catalytic component can be also carried out by prepolymerization with ethylene or propylene both in a hydrocarbon solution or suspension of liquid monomer, in the presence of one or more Aluminium alkyls, preferably $Al(C_2H_5)_3$, $Al(i-C_4H_9)_3$ or their mixtures; the concentration of Aluminium alkyl, before the prepolymerization, is preferably between 1 and 10 g/l; the molar ratio between Aluminium alkyl and Titanium is preferably from 2 to 25; the weight ratio between the prepolymer and dissolved solid component of liquid (II) consisting of $AlCl_3$, $MgCl_2$ and Titanium compound is preferably from 1 to 10.

Alternatively liquid (I) and liquid (II) can be fed directly into the polymerization reactor; in this case the catalytic component is generated in situ in the reactor.

Liquid (II) is preferably previously put in contact with the organometallic compound of Aluminium (I) dissolved in hydrocarbon; in this case the catalytic solid is generated immediately before the polymerization reaction without carrying out any operation to separate the solid (A).

The following examples provide a better illustration of the invention.

The preparation of the polymers was carried out in a 3-liter autoclave using the following procedure:

Cleansing with propylene containing Aluminium triisobutyl at 5% weight/volume, is carried out with subsequent washing with fresh propylene. 1.8 liter of liquid propylene "polymerization grade" at room temperature, are fed, at 23° C., the autoclave is then brought to the polymerization temperature and gases of hydrogen and ethylene are introduced through an immersed tube in the pre-established ratio and in such a way as to reach the partial pressures desired.

The catalyst is prepared as follows:

A solution of Aluminium alkyl in hexane at a concentration of from 2 to 4% weight/volume (component "B"); is prepared in a glass funnel maintained under a nitrogen atmosphere; 50% of this solution is poured into a 50 ml glass flask, equipped with a lower tap and maintained under a nitrogen atmosphere, into which solid component "A" in a hexane suspension, or directly a quantity of liquid (II), is immediately fed. The catalytic suspension thus obtained is poured into a steel barrel placed above the autoclave, and the pouring is completed by washing the flask with the remaining 50% of the solution containing the organometallic compound. The content of the barrel is then immediately and rapidly fed into the autoclave using an overpressure of nitrogen. The pressure of the autoclave is kept constant during the test by feeding ethylene from a cylinder with controlled weight. At the end of the experiment the residual monomers are degassed and the autoclave is emptied.

The polymer is finally homogenized with a roll mixer and characterized.

Examples 1 and 2 refer to catalysts obtained with a process which comprises the dissolution of Magnesium chloride in a mixture of 1,2-dichloroethane and toluene, whereas in examples 6 to 22 this dissolution takes place in a mixture of 1,2-dichloroethane and n-butyl chloride.

In particular, for the synthesis of the ethylene-propylene copolymers solid catalytic components were used containing respectively: titanium tetra n-butylate (examples 1 and 2) and titanium tetra n-butylate together with anisole (examples 3 to 5).

Examples 6, 7 and 8 refer to liquid catalytic components fed directly into the polymerization reactor, without the previous separation of a solid and which also form the precursors of the solid catalysts described in examples 9 to 16; they contain respectively Titanium tetra n-butylate, Titanium tetrachloride, Titanium chloro tri-isopropylate.

Examples 9 to 16 refer to prepolymerized solid catalysts, examples 17 to 22 refer to solid catalysts containing Ti tetra n-butylate.

EXAMPLES

Examples 1 and 2

Dissolution of Magnesium Chloride in 1,2-Dichloroethane and Toluene

The following products are charged in order into a 250 ml flask with a flat bottom and breakwater, equipped with a stirrer, reflux cooler and pumped with anhydrous nitrogen: 44.2 grams of anhydrous $AlCl_3$, 10.5 grams of anhydrous $MgCl_2$ flakes, 142 ml of toluene and 17.3 ml of 1,2 dichloroethane both anhydrified on molecular sieves. The suspension is then heated and the mixture of liquids brought to boiling point in 1 hour and maintained as such for 2 hours.

During the treatment the development of acid gas is observed. At the end of the reaction a dark-brown solution is obtained which on filtration leaves only traces of solid. The solution is characterized by the following molar ratios: Al/Mg=3, 1,2-dichloroethane/Mg=2, Toluene/Mg=12.

Preparation of the Liquid (II)

50 ml of the solution of $MgCl_2$ in 1,2-dichloroethane plus toluene prepared as described above, 30 ml of anhydrous 1,2-dichloroethane and 7.15 ml of Titanium tetra-n-butylate diluted in 10 ml of 1,2-dichloroethane are charged into a large 100 ml test-tube with magnetic stirrer and pumped with nitrogen; after the addition of the Titanium compound there is a development of heat. The solution obtained is characterized by the molar ratios Mg/Ti=1.5; TIBA/Ti=6.

Preparation of the Solid Catalytic Component Precipitate Containing Titanium Tetra-n-butylate 250 ml of a solution consisting of Aluminium triisobutyl (TIBA) at 10% weight/volume in hexane are charged into a pear-shaped flask, with stirrer, reflux cooler and pumped with nitrogen; 87 ml of the liquid (II) prepared as described above are then fed in 1 minute. After the addition of the liquid (II) there is a development of heat and immediate formation of a dark solid. The mixture is heated in 30 minutes to 50° C. and then left under stirring for 2 hours. After filtration using a funnel with a porous septum in a nitrogen environment, the precipitate is washed 3 times with anhydrous hexane at room temperature and is dried under vacuum. The solid obtained weighs 7.4 grams and has the following analytical weight composition:

Total Ti=11.7% Mg=7.85% Al=2.7%, Cl=55.35%, (O-n-$C_4H_9$) group=0.9.

The evaluation of the behaviour in polymerization is carried out operating under the conditions shown in Table 1.

TABLE I

| Example | Temp. (°C.) | Molar ratio Ethyl./Propyl. liquid phase | Pressures Ethylene (bar) | Pressures Hydrogen (bar) | Pressures Total (bar) | Duration time (hrs.) | Component "A" quantity | TIBA (1) (mmol./lt) | Molar ratio Al/Ti | Polymer obtained (grams) | Yield Kg polym./ g. catal.) | Yield (Kg polym./ g. Ti) |
|---|---|---|---|---|---|---|---|---|---|---|---|---|
| 1 | 40 | 0.0526 | 2.5 | 0.1 | 18.2 | 1 | 0.0058 g | 2.1 | 267 | 146 | 25.2 | 215 |
| 2 | 40 | 0.0753 | 3.5 | 0.5 | 19.6 | 1 | 0.008 g | 2.1 | 193 | 138 | 17.3 | 147.4 |
| 3 | 40 | 0.0526 | 2.5 | 0.1 | 18.2 | 1 | (*) 0.15 cc | 4.2 | 430 | 137 | — | 488.5 |
| 4 | 40 | 0.0723 | 3.5 | 0.5 | 19.6 | 1 | (*) 0.10 cc | 2.8 | 645 | 145 | — | 775.4 |
| 5 | 40 | 0.163 | 7.1 | 3. | 25.6 | 1 | (*) 0.07 cc | 1.4 | 1383 | 107 | — | 817.4 |
| 6 | 40 | 0.0526 | 2.5 | 0.1 | 18.2 | 1 | 1.11 cc | 2.8 | 406 | 230 | | 387 |
| 7 | 40 | 0.0526 | 2.5 | 0.1 | 18.2 | 1 | 0.08 cc | 2.8 | 539 | 221 | | 493 |
| 8 | 40 | 0.0526 | 2.5 | 0.1 | 18.2 | 1 | 0.1 cc | 4.2 | 842 | 167 | | 388 |
| 9 | 40 | 0.0526 | 2.5 | 0.1 | 18.2 | 1 | 0.0255 g | 2.8 | — | 261 | 10.2 | — |
| 10 | 40 | 0.163 | 7.1 | 3.5 | 26.2 | 1 | 0.0103 g | 1.4 | | 86 | 8.3 | |
| 11 | 50 | 0.124 | 6.2 | 3.6 | 29.6 | 1 | 0.0129 g | 1.4 | | 191 | 14.8 | |
| 12 | 40 | 0.0526 | 2.5 | 0.1 | 18.2 | 0.5 | 0.0247 g | 2.8 | — | 249 | 10.1 | — |
| 13 | 40 | 0.163 | 7.1 | 3.5 | 26.2 | 1 | 0.0084 g | 1.4 | | 126 | 15 | |
| 14 | 40 | 0.124 | 6.2 | 3.6 | 29.6 | 0.5 | 0.012 g | 1.4 | | 127 | 10.6 | |
| 15 | 40 | 0.0526 | 2.5 | 0.1 | 18.3 | 1 | 0.0160 g | 2.8 | | 190 | 11.9 | |
| 16 | 40 | 0.0526 | 2.5 | 0.5 | 18.8 | 1 | 0.0161 g | 2.8 | | 187 | 11.6 | |
| 17 | 40 | 0.0526 | 2.5 | 0.1 | 18.2 | 1 | 0.0102 g | 2.8 | 313 | 231 | 22.6 | 300 |
| 18 | 40 | 0.0753 | 3.5 | 0.5 | 19.7 | 1 | 0.0081 g | 2.1 | 296 | 162 | 20 | 264.9 |
| 19 | 40 | 0.163 | 7.1 | 3.5 | 26.2 | 1 | 0.0059 g | 1.4 | 271 | 110 | 18.6 | 246.9 |
| 20 | 40 | 0.0526 | 2.5 | 0.1 | 18.2 | 1 | 0.0055 g | 2.8 | 405 | 128 | 23.3 | 214.5 |
| 21 | 40 | 0.0753 | 3.5 | 0.5 | 19.6 | 1 | 0.0065 g | 2.1 | 257 | 106 | 16.3 | 150.3 |
| 22 | 50 | 0.0753 | 3.9 | 0.1 | 23.7 | 0.83 | 0.0054 g | 2.1 | 309 | 202 | 37.4 | 344.8 |

(1) Aluminium triisobutyl
(*) Solid catalytic component suspended in anhydrous heptane; concentration in Ti = 0.187% weight/volume

Examples 3–5

Preparation of the Solid Catalytic Component Precipitate Containing Titanium Tetra-n-butylate and Anisole The following products are charged in order and under stirring into a 100 ml large test-tube with mechanical stirrer and pumped with nitrogen:
- 70 ml of the solution of $MgCl_2$ in 1,2-dichloroethane and toluene prepared as described in examples 1 and 2;
- 30 ml of anhydrous 1,2-dichloroethane;
- 9.54 grams of anisole diluted in 10 ml of 1,2-dichloroethane (in 15 minutes);
- 10 grams of Titanium tetra-n-butylate diluted in 10 ml of 1,2-dichloroethane (in 15 minutes).

After 1.5 hours at room temperature, the mixture is fed in 30 seconds into a 1 liter flask equipped with stirrer, cooler, pumped with nitrogen and containing 350 ml of a hexane solution of TIBA at 10% weight/volume. After the addition of the liquid (II) there is a development of heat and immediate formation of a dark solid. The mixture is heated in 30 minutes to 50° C. and then left under stirring for 2 hours. After filtration using a funnel with a porous septum in a nitrogen environment, the precipitate is washed 3 times with anhydrous hexane at room temperature and is dried under vacuum at 55° C. for 2 hours. The solid obtained weighs 11 grams and has the following analytical weight composition:
Total Ti=10.3%, $Ti^{3+}$=10%; Mg=8.65%, Al=1.4%, Cl=52.8%, ($O-n-C_4H_9$) group=3.3%; Anisole=2.8%.

Example 6

Dissolution of Magnesium chloride in 1,2-dichloroethane: The following products are charged in order into a 250 ml flask with a flat bottom and breakwater, equipped with a stirrer, reflux cooler and pumped with anhydrous nitrogen: 14.9 grams of anhydrous $AlCl_3$, 3.55 grams of anhydrous $MgCl_2$ flakes and 74 ml of 1,2 dichloroethane anhydrified on molecular sieves; 12 ml of n-butyl chloride are then added in 15 minutes, at room temperature. During the dripping of the alkylhalide, there is a development of acid gas.

The suspension is then heated to a temperature of 80° C. in 0.5 hours and maintained as such for 1.5 hours.

At the end of the reaction a dark-brown solution is obtained which on filtration leaves only traces of solid.

The solution is characterized by the following molar ratios: Al/Mg=3, Al/n-butylchloride=1.

Preparation of the liquid catalytic component containing Titanium tetra n-butylate:

25 ml of the solution of $MgCl_2$ in 1,2-dichloroethane prepared as described above and 1 ml of Titanium tetra n-butylate are charged into a 50 ml test-tube with magnetic stirring and pumped with nitrogen; after the addition of the Titanium compound there is a development of heat. The solution obtained is characterized from a molar ratio Mg/Ti=4.

Example 7

A liquid catalytic component containing Titanium tetrachloride is prepared: the same procedure is used as in example 6 using $TiCl_4$ as Titanium compound.

Example 8

A liquid catalytic component containing Titanium chloro-tri-isopropylate is prepared: the same procedure is used as in example 6 using Titanium chloro-triisopropylate as Titanium compound.

Examples 9–11

Preparation of the prepolymerized solid catalytic component containing Titanium tetra-n-butylate:

150 ml of anhydrous hexane, 4.5 grams of aluminium triisobutyl (diluted at 10% weight in hexane) and 13 ml of solution containing Titanium tetra n-butylate prepared as described in example 6 are charged into a 500 ml flask thermostat-regulated and equipped with a reflux cooler; the temperature is then brought under stirring to 50° C.; "polymerization grade" ethylene is fed up to a constant pressure of 75 mmHg and the prepolymerization is continued for 3.5 hours. At the end the liquid part is removed by decanting, the polymer is washed three times with anhydrous hexane and the solid is dried under vacuum. The preparation produces 2.4 grams of powder.

Examples 12–14

Preparation of the prepolymerized solid catalytic component containing Titanium tetrachloride:

The same procedure is used as in examples 9 to 11, using the solution containing Titanium tetrachloride prepared as described in example 7.

Examples 15–16

Preparation of the prepolymerized solid catalytic component containing Titanium chloro tri-isopropylate:

The same procedure is used as in examples 9 to 11, using the solution containing Titanium chloro tri-isopropylate prepared as described in example 8.

Examples 17–19

Preparation of the solid catalytic component precipitate containing Titanium tetra-n-butylate:

50 ml of the solution of $MgCl_2$ in 1,2-dichloroethane, prepared as described in example 6, and 2.1 grams of Titanium tetra-n-butylate (molar ratio Mg/Ti=3.5) are charged into a 100 ml test-tube with magnetic stirring and pumped with nitrogen; after the addition of the Titanium compound the solution is left to mature for 2 hours at the same temperature; the liquid thus obtained is rapidly fed into a 500 ml thermostat-regulated flask, equipped with a reflux cooler, magnetic stirrer and pumped with nitrogen, containing 184 ml of a hexane solution of aluminium triisobutyl (TIBA) at 10% weight; the molar ratio TIBA/Ti is thus equal to 15. After the mixing there is a development of heat and immediate formation of a dark solid. The suspension is then heated to 50° C. for 1.5 hours, the precipitate is filtered and washed 3 times with anhydrous hexane.

The solid after drying under vacuum has the following analytical weight composition: Total Ti=7.55%; Mg=12%; Al=2.45%; Cl=57.55%; ($O-n-C_4H_9$) group: less than 0.1%.

Examples 20 to 22

Preparation of the solid catalytic component precipitate containing Titanium tetra-n-butylate:

The same procedure is used as described in examples 17 to 19, but the quantities of Titanium compound and TIBA are modified in order to bring the molar ratio Mg/Ti to 1.5 and the molar ratio TIBA/Ti to 6.3. The solid obtained after drying under vacuum has the following analytical weight composition:
Total Ti=10.85%; $Ti^{3+}$=10.65%; Mg=6.75%; al=2.5%; Cl=46.6%; ($O-n-C_4H_9$) group=0.93%.

Table 1 indicates the copolymerization conditions of ethylene with propylene for all the catalysts in the examples and also the polymerization yields.

A comparison between the results of the polymerization tests relating to examples 3, 4 and 5 with those relating to examples 1 and 2, shows that the introduction of anisole as electron-donor compound in the preparation of catalytic component "A", produces a considerable increase in the yield with the same molar ratio ethylene/propylene in the feeding.

Examples 1 and 2 also show that an increase in the partial hydrogen pressure causes a decrease in the catalytic activity even though it is associated with an increase in the concentration of ethylene; on the contrary when component "A" contains anisole a contemporaneous increase in the concentrations of hydrogen and ethylene produce an increase in the yield.

Examples 6, 7 and 8 show that a solid component containing the supported Titanium compound, having a high catalytic activity, can be generated in situ in the polymerization reactor by directly feeding solution (II).

As is shown in examples 9 to 16, the prepolymerization of the liquid components described in examples 6–8, enables high catalytic activities to be obtained.

Examples 17 to 19, compared with examples 20 and 21, show that an increase in the Titanium content in the solid component cause a reduction in the catalytic yield calculated with respect to the Titanium itself.

The method consists in measuring the ratio between the band absorbances at 4390 and 4255 $cm^{-1}$ and using a calibration curve calibrated with standard polymers.

Intrinsic viscosity.

The measurements were carried out in Orthodichlorobenzene at 135° C. using an Ubbelhode-type Viscosimeter; the fall times of the solvent and solutions with increasing concentration of the polymer being tested were measured. The extrapolation of the reduced viscosity and that referring to concentration zero gave the intrinsic viscosity value.

Molecular weight distribution.

These analyses were carried out with gel permeation chromatography in orthodichlorobenzene at 135° C., using an ALC/GPC 150 "WATERS" device equipped with a refraction index detector and a set of 10 micron PL GEL columns with porosity in Angstrom of $10^3$, $10^4$, $10^5$, $10^6$.

The calibration curve used for the calculation was obtained by using standard monodispersed samples of polystyrene applying the equation of Mark-Houwink valid for linear polyethylene and polypropylene; the molecular weights were corrected in accordance with the composition by the equation of Scholte (Th. G. Scholte, N. L. J. Meijerink and others: J. Appl. Polym. Sci., 1984, 29, 3763–3782).

The results of these analyses are shown in Table 2.

TABLE II

| Example | Propylene content (% w/w) | Intrinsic Viscosity (dl/g) | Molecular weight distrib. (Mw/Mn) | Weight average molecul. weight (Mw × 0.001) | Mooney Viscosity ML(1 + 4.100) | Mooney Viscosity ML(1 + 4.125) |
|---|---|---|---|---|---|---|
| 1 | 55.2 | 1.7 | 22.5 | 224 | 23 | |
| 2 | 45.1 | 1.5 | 19. | 226 | 30 | |
| 3 | 47.7 | — | 25 | 279 | 65 | |
| 4 | 42.8 | 1.7 | 14.4 | 221 | 36 | |
| 5 | 26.8 | 1.5 | 15.1 | 153 | 36 | |
| 6 | 52.8 | 1.8 | 6.8 | 185 | | 24 |
| 7 | 52.4 | 1.4 | 9.3 | 143 | | 13 |
| 8 | 47 | 1.55 | 14 | 177 | 36 | |
| 9 | 53.1 | 2.2 | 18.4 | 234 | | 30 |
| 10 | 33.1 | 1.5 | 14.8 | 151 | 36 | |
| 11 | 43.8 | 1 | 20 | 99 | 12 | |
| 12 | 54.1 | 1.8 | 22 | 192 | | 38 |
| 13 | 29.2 | 1.6 | 9.3 | 115 | 41 | |
| 14 | 42.5 | 1.1 | 10 | 102 | 17 | |
| 15 | 53 | 2.3 | — | — | | 48 |
| 16 | 51.7 | 1.95 | 21 | 265 | 46 | |
| 17 | 50.8 | 2.1 | 21 | 303 | 51 | |
| 18 | 41.2 | 1.9 | 21.8 | 250 | 44 | |
| 19 | 28.6 | 1.0 | 13.4 | 169 | 36 | |
| 20 | 53.2 | 1.9 | 12.1 | 290 | 47 | |
| 21 | 42.3 | 1.8 | 13.7 | 194 | 32 | |
| 22 | 45 | 2.0 | 26.5 | 301 | 40 | |

A comparison between example 21 and example 22 shows that by increasing the polymerization temperature there is a considerable increase in the productivity of the catalytic system.

PHYSICAL MECHANICAL ANALYSES AND CHARACTERIZATIONS

The following measurements were carried out on the polymers obtained:

Propylene content via IR on the polymers in the form of 0.2 mm thick films; using a Perkin-Elmer model 1760 FTIR spectrophotometer.

With the liquid components described in examples 6 to 8, $M_w/M_n$ values are obtained which are lower than or at least very close to those obtained with all the other catalytic components in the examples and in particular with the corresponding prepolymerized catalysts (examples 9 to 16).

The results relating to examples 1 to 6 compared to those of examples 17 to 22, show that the different ways of dissolving the Magnesium chloride or introducing the anisole together with the Titanium compound, enable the synthesis of copolymers of the same type, characterized by ample polydispersity, the $M_w/M_n$ values being between 10 and 30.

Vulcanization and preparation of the samples for physical-mechanical characterization.

The mixtures to be vulcanized were prepared using the formulations shown in table 3.

TABLE 3

| Ingredients | Parts by weight |
| --- | --- |
| Polymer | 100 |
| Fef carbon black (1) | 55 |
| ZnO | 5 |
| Peroximon F40 Mg (2) | 5 |
| Sulphur | 0.37 |
| Eil 570 Oil (3) | 30 |

(1) High Abrasion Furnace low structure carbon black of Cabot;
(2) bis-(tert-butylperoxy-isopropyl benzene, masterbatch at 40% in EP copolymer, produced by Atochem;
(3) paraffin oil having a specific weight of 0.88 of Exxon The vulcanizability of the copolymers was determined according to the method ASTM D2084–86, with a Monsanto MDR 100-S Rheometer, at a temperature of 160° C. with an oscillation frequency of the rotor of 50 min$^{-1}$, deformation angle 0.2°, gap 0.2 mm. The following measurements were carried out: time necessary for reaching 2% of the maximum twisting moment (t02); time necessary for reaching 90% of the maximum twisting moment (t90); maximum vulcanizing rate.

Mechanical characteristics of the vulcanized copolymers.

The characteristics of the vulcanized copolymers were measured according to the ASTM methods shown in table 4, using samples taken from plates moulded in a plate-press at 165° C. for 40 minutes and at 18 MPa.

TABLE 4

| Characteristic | Method |
| --- | --- |
| Ultimate tensile stress | D 412-68 |
| Ultimate elongation | D 412-68 |
| Tension set at 200% | D 412-68 |
| Shore A Harness | D 2240-68 |

Table 5 shows the results of the characterizations carried out on the copolymers obtained with the physico-mechanical measurements before and after vulcanization. These results show that all the catalysts produce easily cross-linkable copolymers, with good final mechanical and elastic properties.

TABLE V

| Example | Mooney Viscosity of the blend ML(1 + 4.100) | Vulcanization | | | Ultimate tensile stress (MPa) | Elongation to break (%) | Tension set 200%; 25° C. (%) | Shore A hardness |
| --- | --- | --- | --- | --- | --- | --- | --- | --- |
| | | t02 (min.) | t90 (min.) | V max. (N m/min) | | | | |
| 1 | 24 | 0.9 | 22.2 | 0.008 | 7.25 | 500 | 12 | 46 |
| 2 | 29 | 0.8 | 21.9 | 0.011 | 7.45 | 500 | 14 | 52 |
| 3 | 52 | — | — | — | 6.45 | 640 | 18 | 49 |
| 4 | 33 | 0.7 | 21.7 | 0.014 | 9.8 | 510 | 13 | 52 |
| 5 | 41 | — | — | — | 9 | 660 | 68 | 67 |
| 6 | 34 | 0.7 | 21.3 | 0.012 | 9.7 | 540 | 8 | 46 |
| 7 | 22 | 0.73 | 21.9 | 0.0097 | 7.3 | 510 | 10 | 46 |
| 8 | 33 | 0.8 | 23.7 | 0.012 | 8.4 | 500 | 10 | 48 |
| 9 | 43 | 0.73 | 20.6 | 0.014 | 10.5 | 560 | 8 | 47 |
| 10 | 39 | 0.83 | 21.2 | 0.011 | 9.2 | 560 | 10 | 47 |
| 16 | 46 | 0.75 | 21 | 0.013 | 12.2 | 560 | 12 | 49 |
| 17 | 46.5 | 0.8 | 20.7 | 0.0145 | 12.8 | 580 | 10 | 46 |
| 18 | 41 | 0.77 | 20.4 | 0.017 | 14.5 | 580 | 14 | 51 |
| 19 | 40 | 0.8 | 21.6 | 0.017 | 15.9 | 588 | 54 | 64 |
| 20 | 36 | 0.8 | 20.4 | 0.011 | 12.54 | 660 | 10 | 46 |
| 21 | 33 | 0.75 | 21.3 | 0.015 | 9.2 | 470 | 13 | 52 |

We claim:

1. A process for the preparation of a solid component of a catalyst for the synthesis of an elastomeric ethylene-propylene copolymer prevalently amorphous, comprising a titanium compound supported on a solid consisting essentially of MgCl$_2$, and said process consisting essentially of the steps of:
   i) contacting a solution (I) consisting substantially of an organometallic compound of aluminum diluted with aliphatic hydrocarbons, with a solution (II) prepared by the following steps:
      a) dissolving an anhydrous magnesium halide in a composition of solvents said solvents being halohydrocarbons, aromatic hydrocarbons or mixtures thereof, in the presence of an aluminum trihalide;
      b) treating said solution (a) with a tetravalent titanium compound having general formula Ti(OR)$_{4-n}$X$_n$, wherein R is an aliphatic, cycloaliphatic or aromatic hydrocarbon radical containing from 1 to 20 carbon atoms, X is a halogen and n is an integer from 0 to 4; and
   ii) separating the solid catalytic component thus formed.

2. The process of claim 1, characterized in that the liquid (II) is obtained by treating anhydrous MgCl$_2$ and AlCl$_3$ with a mixture of 1,2-dichloroethane and toluene, or with a mixture of n-butylchloride and 1,2-dichloroethane, at a temperature of between 10° and 90° C., subsequently adding, after cooling to a temperature of between 10° and 40° C., a Titanium compound selected from TiCl$_4$, Ti(O-n-C$_4$H$_9$)$_4$, TiCl(O-n-C$_4$H$_9$)$_3$.

3. The process of claim 1, wherein said magnesium halide is MgCl$_2$, said halohydrocarbon is n-butylchloride, and said aluminum trihalide is AlCl$_3$, and in the preparation of the liquid (II), the ingredients are reacted in the following molar ratios: AlCl$_3$/MgCl$_2$ from 1 to 5; n-butylchloride/AlCl$_3$ not less than 0.1; MgCl$_2$/Ti from 0.5 to 5.

4. The process of claim 1, wherein said magnesium halide is MgCl$_2$, said halohydrocarbon is 1,2-dichloroethane, and said aluminum trihalide is AlCl$_3$, and in the preparation of the liquid (II) the ingredients are reacted in the following molar ratios: AlCl$_3$/MgCl$_2$ from 1 to 5; 1,2-dichloroethane/AlCl$_3$ not less than 0.1; MgCl$_2$/Ti from 0.5 to 5.

5. The process of claim 1, characterized in that the reaction between the liquid (I) and liquid (II) takes place directly in the polymerization reactor and, the molar ratio between the organometallic component of Aluminum and the titanium compound is between 3 and 20.

6. The process of claim 2, wherein the solid catalyst component is prepolymerized with ethylene, propylene, or their mixtures in the presence of at least one aluminum alkyl with a molar ratio aluminum alkyl/Ti of between 2 and 25 and characterized in that the weight ratio between the prepolymer and solid consisting of $MgCl_2/AlCl_3$ and the titanium compound dissolved in liquid (II), is between 1 and 10.

7. The process of claim 1, wherein step (b) is followed by the steps of:

(c) treating said solution with an electron-donor compound, said electron-donor compound being an ester of a carboxylic acid or an ether, and said ether being alkyl, aryl or arylalkyl ether, simultaneously with or following treatment with the titanium compound of step (b) to form a solid catalylic component; and separating and purifying the solid catalytic component thus formed.

* * * * *